Dec. 15, 1953  O. R. WEBER  2,662,701
REEL APPARATUS FOR FORMING COILS OF CABLE
Filed Aug. 17, 1950  2 Sheets-Sheet 1

INVENTOR.
Otto R. Weber,
BY
W. Lee Helms
ATTORNEY.

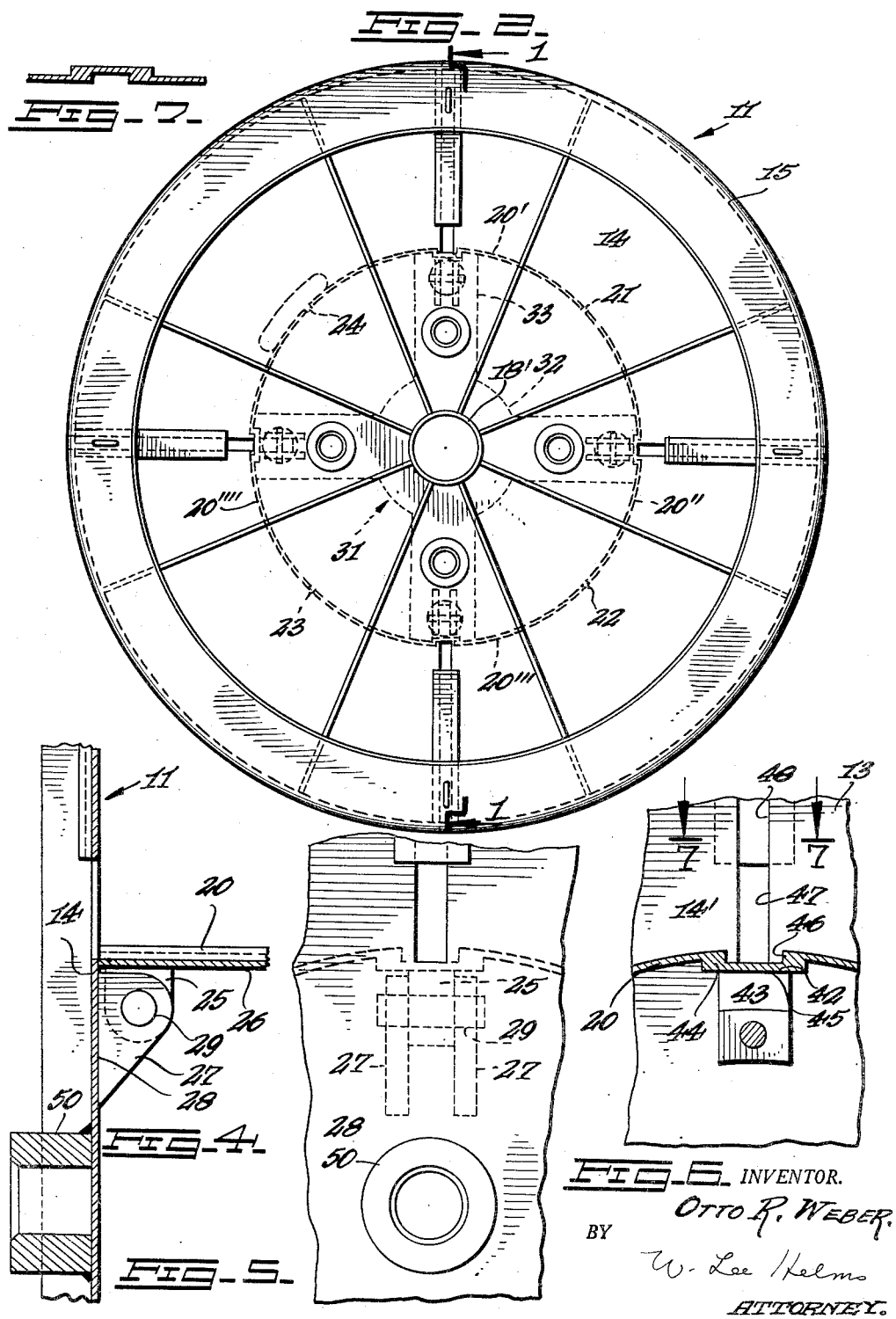

Patented Dec. 15, 1953

2,662,701

UNITED STATES PATENT OFFICE 2,662,701

REEL APPARATUS FOR FORMING COILS OF CABLE

Otto R. Weber, Louisville, Ky., assignor to Reynolds Metals Company, Richmond, Va., a corporation of Delaware Application August 17, 1950, Serial No. 179,900

3 Claims. (Cl. 242—111)

The invention relates to an apparatus for forming cable into coils and more particularly to a reel for both winding cable into coils and for straightening mis-shapen and distorted coils previously formed.

As heretofore practiced, the art of forming cable into coils has involved several disadvantages. Since the reels on which the cables are wound into coils on a winding device are relatively large, expensive and bulky, it is necessary to remove the coils of cable from these reels when the coils are to be shipped or stored. When the coils are thus removed, they have a tendency to be easily warped, distorted or mis-shapen, whereby the coils are no longer of a true symmetrical cylindrical form. Consequently considerable difficulties arise in utilizing these distorted mis-shapen coils and in mounting them on the arbors of devices.

It is therefore a primary object of the present invention to provide a coil forming reel which is adapted to be quickly and easily inserted within a distorted, non-cylindrical coil of cable and which will then straighten and align the mis-shapen coil so as to render the latter symmetrical and cylindrical.

This object is achieved by providing the reel of the present invention with a collapsing segmented arbor. The arbor segments are each pivotally secured at one end to a fixed flange in such a manner that the segments may be pivoted inwardly to a collapsed relation having a reduced diameter whereby the arbor may be easily inserted into the opening of a mis-shapen non-cylindrical coil. A removable second flange is provided at the other end of the arbor and is adapted to be slidably moved with respect thereto toward the fixed first flange. The second flange is provided with a plurality of cams co-acting with the arbor segments so as to pivot the latter outwardly upon movement of the second flange toward the first flange. When the arbor segments are thus pivoted outwardly, the arbor resumes its expanded non-collapsed cylindrical form, so as to press outwardly against the interior of the coil, and in so doing forms the distorted coil into a symmetrical cylindrical shape.

In addition to the coil forming function, the reel of the present invention is also provided with mounting means for securing the reel to a rotatable winding device whereby cable may be wound into coil form on the arbor of the reel.

Another object of the present invention is to provide a groove and channel arrangement in the arbor and the flanges for receiving a tie-wire which is placed in position on the reel before the winding is commenced and then may be easily tied around the wound coil after the winding operation has been completed.

It is to be understood that the specific embodiment of the invention shown in the drawings and described in more detail hereinbelow is intended to be merely illustrative of one of the many forms which the invention may take in practice without departing from the scope of the invention as set forth in the appended claims. For instance, although the arbor segments are herein shown and described as being pivotally mounted to the fixed flange, other suitable arrangements for mounting the arbor segments for movement toward the arbor axis in a collapsed relation so as to reduce the diameter of the arbor are within the scope of the invention. Furthermore, although the disclosed form of the invention is provided with a plurality of cam elements on the movable flange and co-acting with the arbor segments for pivoting the latter outwardly towards their expanded positions, it is to be understood that any other equivalent means for achieving this function may be employed.

Referring to the drawing, in which

Fig. 2 is a side elevational view of the fixed-flange end of the reel;

Fig. 4 is a partial sectional view showing the means for pivotally mounting the ends of the arbor segments to the fixed flange and also the means for mounting the fixed flange to a rotatable element of a winding device;

Fig. 5 is a partial side elevational view showing an enlargement of a part of Fig. 2;

Fig. 6 is a vertical sectional view taken on the line 6—6 of Fig. 1; and

Fig. 7 is a sectional view taken on the line 7—7 of Fig. 6.

Figure 1:
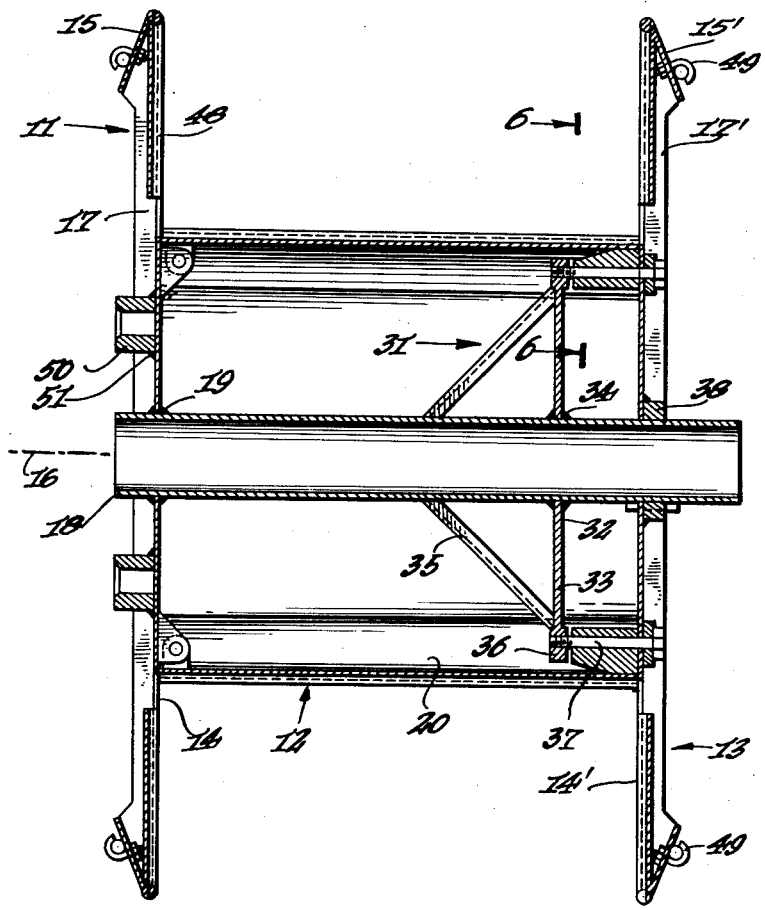
Fig. 1 is a vertical transverse sectional view taken on the line 1—1 of Fig. 2.
Figure 3:
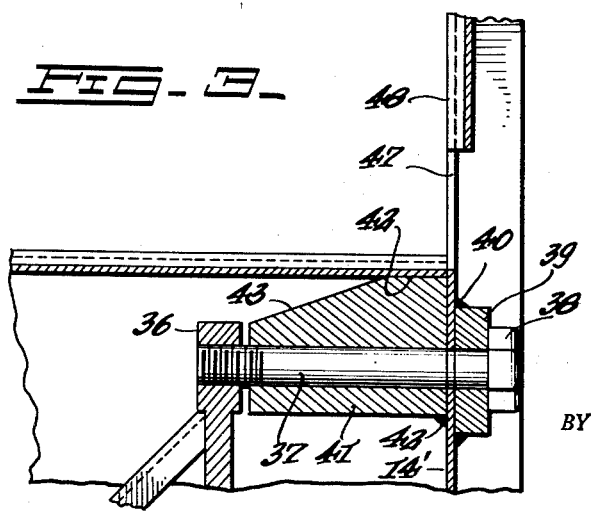
Fig. 3 is a partial sectional view showing the cam means for pivoting the arbor segments outwardly and also a screw arrangement for moving the removable flange toward the fixed flange.

Referring now to Fig. 1, the disclosed embodiment of the coil forming reel comprises generally a fixed flange 11 mounted at one end of a collapsible arbor 12, the latter having at the other end thereof a removable flange 13. In more detail and as best seen in Fig. 2, the fixed flange 11 comprises a circular plate 14 having at the outer peripheral edge thereof and rigidly secured thereto an annular reinforcing plate 15 extending inwardly toward the axis 16 of the reel and outwardly of the plate 14. A plurality of brace ribs 17 are secured to the outer surface of the plate 14 and the inner surface of the plate 15. The brace ribs 17 extend radially outwardly from a central opening in the plate 14 to the outer peripheral edge of the latter. A longitudinal tubular member 18 extends transversely of the fixed flange 11 through the central opening, and the flange 11 is secured on one end of the member 18 as by welding at 19.

The arbor 12 is segmented and comprises a plurality of longitudinal arcuate segments 20 so arranged as to form a collapsible arbor 12 having a cylindrical outer surface. As shown in Fig. 2, the arbor 12 comprises four segments 20 indicated as 20', 20'', 20''' and 20''''. In the expanded non-collapsed condition of the arbor 12, the adjacent edges of the arbor segments 20' and 20'' will be spaced apart as indicated at 21. Similarly the adjacent edges of the other adjoining arbor segments 20 will be spaced apart as indicated at 22, 23 and 24, respectively. As best seen in Fig. 4, the left-hand ends of the arbor segments 20 are provided with downwardly-extending ear or flange members 25 secured to the under surface 26 of each of the arbor segments 20. A pair of spaced lugs 27 are secured to and extend inwardly from the inner surface 28 of the plate 14 of the fixed flange 11 and receive therebetween the flange member 25. A pin 29 extends through suitable aligned apertures in the lugs 27 and flange members 25 whereby the arbor segments 20 will be rotatably mounted on the fixed flange 11 for pivotal movement about the axes of the respective pins 29. It will thus be seen that the arbor segments may be pivoted inwardly toward the axis 16 of the arbor 12 whereby the latter will assume a tapered exterior shape. The segments 20 may then be pivoted outwardly away from the arbor axis 16 so that the arbor 12 may resume a cylindrical shape in the expanded relation of the arbor segments 20.

As best seen in Figs. 1 and 2, a supporting means indicated generally at 31 is fixedly secured on an intermediate portion of the tubular member 18 and comprises a circular portion 32 having four integral arms 33 extending radially therefrom. The circular portion 32 is apertured so as to enable the tubular member 18 to extend therethrough and is fixedly held thereon by means of welding indicated at 34. A plurality of diagonally extending brace elements 35 serve to rigidify the supporting means 31. Each of the radially extending arms 33 is provided at its outermost end with a lug portion 36 having a threaded aperture extending therethrough. A threaded stud or pin 37 extends within each of the apertures and in threaded engagement therewith at the innermost end of the pin 37.

The removable flange 13 is constructed similar to the fixed flange 11 and comprises a plate 14', an annular reinforcing plate 15' secured thereto, and a plurality of radially extending reinforcing ribs 17'. A sleeve 38 is secured to the plate 14' and has a bearing opening extending therethrough so as to enable the removable flange 13 to slide on the tubular member 18.

The pins 37 extend outwardly from their threaded ends and through suitable apertures in the plate 14' of the removable flange 13. The outermost ends of the pins 37 are provided with bolt heads 38 or other suitable wrench-engageable means for turning the pins 37. A plurality of washers 39 are each mounted on a respective pin 37 between the bolt head 38 and the outer surface of the plate 14' and are preferably secured to the latter as by welding at 40. A cam element 41 surrounds each of the pins 37 and is fixedly secured to the inner surface of the plate 14' as by welding at 42. The upper portion of the cam element 41 is provided adjacent its outermost end with a flat surface 42 extending parallel to the axis 16 of the reel. The upper portion of each of the cam elements 41 is also provided with a downwardly sloping flat surface 43 extending from the surface 42 to the inner most end of the cam element 41. As best seen in Fig. 6, the lower surface of each of the arbor segments 20 is provided with a longitudinally-extending and downwardly-projecting rib 44 having a flat under surface 45 adapted to abut against and co-act with the surfaces 42, 43 over the respective cam elements 41, as will be described in more detail below.

The pins 37 are rotatively mounted within the apertures formed in the lugs 36, cam elements 41, plate 14' and washers 39. It will be obvious that by rotating the bolt heads 38 by means of a wrench or other suitable means the respective pins 37 will be caused to rotate with respect to the threaded apertures in the lugs 36, so as to advance inwardly or outwardly in a longitudinal direction. By rotating the pins 37 so as to move them inwardly, the bolt heads 38 will abut against the washers 39 so as to cause the removable flange 13 to be slidably moved along the tubular member 18 inwardly towards the fixed flange 11. By rotating the pins 37 in the opposite direction, the threaded ends will become disengaged from the threaded lugs 36. The removable flange 13 is then no longer secured in assembled position and may be slid outwardly along the tubular member 18 and finally removed therefrom.

As best seen in Fig. 7, the outer surfaces of the arbor segments 20 are provided with longitudinally extending grooves or channels 46 and adjacent thereto the plates 14, 14' of the flange 11, 13 are provided with a plurality of rectangular openings 47. The plates 14, 14' are also provided on the inner surfaces with grooves or channels 48 extending radially from the openings 47 to the outer peripheral edges of the plates 14, 14'. The channels 46, openings 47 and grooves 48 are utilized in mounting a tie-wire on the reel preparatory to winding a cable into coil form thereon, as will be explained in more detail below. Secured to the annular brace flanges 15, 15' are a plurality of hook elements 49 to which the ends of the tie-wires may be secured.

As shown in Figs. 1 and 2, a plurality of tubular mounting elements 50 are secured to the outer surface of the fixed flange 11 as by welding at 51. The tubular elements 50 are adapted to be placed on suitable projections of a rotatable element of a winding apparatus whereby the reel may be mounted on and rotated by said apparatus during a winding operation.

Operation

The reel apparatus of the present invention is capable of two entirely distinct modes of operation. The apparatus may be rotated on a winding device so as to wind a cable into coil form around the arbor 12. The apparatus may also be employed to straighten into symmetrical, cylindrical shape a distorted or warped coil which has been previously formed.

When the apparatus is to be used for winding or reeling cable into coils around the arbor 12, the tubular elements 50 are mounted on suitable projections on the rotating element or the winding device, adapted to rotate the reel about axis 16. Before the winding operation is commenced, the reel is assembled in the form shown in Fig. 1. The wires are then inserted through the openings 47, each tie wire being placed longitudinally within one of the channels 46, formed in the exterior surface of the arbor 12. The opposite ends of the tie wires are then extended radially outwardly through the grooves 48, formed in the plates 14, 14' and are then extended around the outer peripheral edges of the latter and are secured to the hook elements 49. The reel is then rotated about the axis 16 so as to wind the cable into a coil on the arbor 12. After the winding operation has been completed, the ends of the tie wires are detached from the hook elements 49 and are brought together around the exterior of the coil and are tied. It will thus be seen that by providing channels and grooves for receiving the tie wires and holding them in position on the reel as the cable is wound thereon, a simple and quick method for securing the coils with tie wires is obtained.

When the reel of the present invention is to be employed for straightening or aligning misshapen or distorted coils which have already been formed, the removable flange 13 is first removed. This is accompanied by turning the head bolts 38 with a wrench or other suitable means so as to thread the studs 37 outwardly from the threaded lugs 36. It will be obvious that after the studs 37 have been disengaged from the lugs 36, the removable flange 13 may be slid along the tubular member 18 in a direction away from the fixed flange 11 and then finally removed from the right-hand end (as viewed in Fig. 1) of the tubular member 18. The arbor segments 20 will then be free to pivot about the pins 29 inwardly toward the axis 16 so as to be in a collapsed condition and its exterior shape will then be tapered toward the right-hand end. Since the right-hand end will then have a reduced diameter, it may be inserted within the axial opening of a cable coil even though the coil is considerably warped or distorted. After the warped non-symmetrical coil is placed on the collapsed arbor 12, the removable flange 13 is slid on the right-hand end of the tubular member 18 and the threaded ends of the studs 37 are placed in initial threaded engagement with the threaded apertures in the lugs 36. At this position of the flange 13 and the studs 37, the flat undersurfaces 45 formed on the arbor segments 20 abut against the downwardly-sloping flat surfaces 43 of the cam elements 41. The studs 37 are then threaded further into the threaded apertures formed in the lugs 36 by rotating the head bolts 38. This causes the flange 13 to be moved inwardly along the tubular member 18 and toward the fixed flange 11. As the flange 13 is thus moved inwardly, the undersurfaces 45 of the arbor segments 20 ride up the sloping surfaces 43 of the cam elements 41 so as to pivot the arbor segments 20 outwardly about the pins 29 and away from the axis 16 toward their expanded positions. As the arbor segments 20 move outwardly, arbor 12 resumes an expanded cylindrical shape and in so expanding presses against the interior of the mis-shapen coil so as to straighten and align the latter into true cylindrical form. The flange 13 may then be removed by unscrewing the studs 37 and the straightened coil easily removed from the arbor 12 after the latter has again been collapsed.

Having described my invention, what I claim and desire to secure by Letters Patent is the following:

1. An apparatus for forming cable into coils comprising a plurality of arcuate segments aligned so as to form a segmented cylindrical arbor around which a coil of cable may be placed, a first flange at one end of said arbor, means pivotally mounting to said flange the ends of said arbor segments adjacent thereto for pivotal movement of the segments in planes extending through the axis of the arbor, whereby the segments may be pivoted toward said axis so as to render the arbor tapered, a second flange at the other end of the arbor and movable axially with respect thereto toward said first flange, and co-acting cam means on said second flange and said segments for pivoting the latter outwardly away from the arbor axis in response to movement of said second flange toward said first flange, wherein at least one of said segments is provided at its outer arcuate surface with a channel extending substantially from one of said flanges to the other thereof, and wherein said, flanges are provided with grooves each extending from adjacent a respective end of said channel to the outer periphery of the flanges, whereby a tie wire may be placed within the channel with the ends of the wire extending through said grooves, and means adjacent the outer periphery of the flanges for securing said tie wire ends thereto.

2. An apparatus for forming cable into coils comprising a plurality of arcuate segments aligned so as to form a segmented cylindrical arbor around which a coil of cable may be placed, a first flange at one end of said arbor, means pivotally mounting to said flange the ends of said arbor segments adjacent thereto for pivotal movement of the segments in planes extending through the axis of the arbor, whereby the segments may be pivoted toward said axis so as to render the arbor tapered, a second flange at the other end of the arbor and movable with respect thereto, and co-acting cam means on said second flange and said segments for pivoting the latter outwardly away from the axis of the arbor in response to movement of the second flange with respect to the arbor, wherein said means for moving said second flange with respect to the arbor comprises a plurality of pin elements, means mounting said pin elements for movement with respect to the arbor, means on said pin elements engageable with said second flange, and means for moving said pin elements with respect to the arbor.

3. A coil forming reel comprising a longitudinal member, a first flange securd to said member at one end thereof and extending transversely thereto, a plurality of arcuate segments aligned so as to form a segmented cylindrical arbor around which a coil of cable may be placed, the axis of said segmented arbor being coincident with the axis of said member, and said arbor segments being spaced radially outwardly from said member and surrounding the latter, means pivotally mounting to said flange one end of each of the arbor segments for pivotal movement of the segments in planes extending through the axis of the arbor whereby the segments may be pivoted toward and away from said member, a second flange extending parallel to said first flange and slidably mounted on the other end of the member for movement toward and away from said first flange, cams secured to said second flange and co-acting with the arbor segments for pivoting the latter outwardly away from the arbor axis in response to movement of said second flange toward said first flange, and co-acting means on said member and said second flange for moving the latter toward said first flange and for securing said second flange in fixed position on said member, wherein said last-recited co-acting means comprises a supporting means fixedly secured on said member, at least one element mounted on said supporting means for reciprocal movement toward and away from said first flange, means on said element engageable with said second flange, and means for moving said element either toward or away from said first flange.

OTTO R. WEBER.

References Cited in the file of this patent

UNITED STATES PATENTS

| Number | Name | Date |
|---|---|---|
| 1,141,449 | Eppler | June 1, 1915 |
| 1,728,144 | Warner et al. | Sept. 10, 1929 |
| 1,831,848 | Doney et al. | Nov. 17, 1931 |
| 2,217,966 | Perkins | Oct. 15, 1940 |